(12) United States Patent
Yatsuka

(10) Patent No.: US 6,657,016 B2
(45) Date of Patent: Dec. 2, 2003

(54) POLYESTER RESIN COMPOSITION

(75) Inventor: Takeshi Yatsuka, Ohtsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 10/096,681

(22) Filed: Mar. 14, 2002

(65) Prior Publication Data

US 2003/0176595 A1 Sep. 18, 2003

(51) Int. Cl.$^7$ .................... C08L 67/00; C09D 167/00
(52) U.S. Cl. ................... 525/442; 525/414; 525/443; 528/148; 528/155; 528/161; 528/163; 528/164; 528/176; 528/183; 528/184; 528/186
(58) Field of Search ................ 525/442, 443, 525/414; 528/148, 155, 161, 163, 164, 176, 183, 184, 186

(56) References Cited

U.S. PATENT DOCUMENTS

| | | |
|---|---|---|
| 5,256,757 A | 10/1993 | Kuo |
| 5,312,891 A | 5/1994 | Kuo |
| 5,334,652 A | 8/1994 | Wellman et al. |
| 5,334,671 A | 8/1994 | Yezrielev et al. |

FOREIGN PATENT DOCUMENTS

| | | |
|---|---|---|
| EP | 0419088 A1 | 3/1991 |

*Primary Examiner*—Patricia A. Short
(74) *Attorney, Agent, or Firm*—Kenyon & Kenyon

(57) ABSTRACT

A polyester resin composition comprising 50 equivalents/ton or more of an aromatic ring in the resin and at least one thermosetting resin selected from the group consisting of melamine resin, urea resin, benzoguanamine resin and phenol resin. The aromatic ring in the polyester resin has a phenolic hydroxyl group and at least one of ortho-position and para-position of the aromatic ring to the phenolic hydroxyl group is a hydrogen atom. The resin composition has excellent toughness at ambient temperature and heat resistance.

1 Claim, No Drawings

POLYESTER RESIN COMPOSITION

FIELD OF THE INVENTION

The present invention relates to a polyester resin composition which is suitable as adhesives, paints and various coating agents and has excellent adhesive property and setting property to various kinds of raw materials.

BACKGROUND OF THE INVENTION

A combination of polyester resin with amino resin such as melamine resin, urea resin and benzoguanamine resin has a thermosetting property and has been used as various paints and coating agents. A combination of polyester resin with phenol resin usually has a poor setting property as compared with the above-mentioned combination and lacks in a multipurpose property.

A thermosetting resin such as melamine resin, urea resin, benzoguanamine resin and phenol resin is set when methylol group caused by formaldehyde and an alkyl-etherized product of methylol group are made to react with hydroxyl group and carboxyl group at the terminal of the polyester resin in the presence of acidic catalyst.

Melamine resin, urea resin, benzoguanamine resin or phenol resin is able to conduct a self-cross-linking but, when the terminal of polyester is a reactive point, the cross-linking density lowers as the molecular weight of the polyester increases. Therefore, the characteristic feature caused by the cross-linking is not improved significantly.

In the setting of polyester resin, there are many cases where the terminal hydroxyl group and carboxyl group are the reactive points. In that case, the cross-linking density lowers when molecular weight of the polyester increases. The characteristic feature caused by the cross-linking is not improved significantly. In addition, a combination of the polyester with the phenol resin has a poor setting property and lacks in multipurpose property.

An object of the present invention is to provide a polyester resin and a composition thereof which has a reactive point other than hydroxyl group and carboxyl group and which is able to set with melamine resin, urea resin, benzoguanamine resin or phenol resin based on the reactive point.

SUMMARY OF THE INVENTION

The present inventors have carried out an intensive investigation for the setting reaction of polyester resins and achieved the present invention. Thus, the present invention is a composition which is characterized in that the composition contains a polyester resin containing 50 equivalents/ton or more of an aromatic ring having a phenolic hydroxyl group and having no substituent at ortho- and/or para-position(s) to the said phenolic hydroxyl group in the resin and also contains at least one member selected from melamine resin, urea resin, benzoguanamine resin and phenol resin.

DETAILED DESCRIPTION OF THE INVENTION

The present invention utilizes an electrophilic substitution reaction of a phenol ring at ortho- or para-position.

Although the polyester resin of the present invention may have a hydroxyl group or a carboxylic acid group utilized as a reactive point as before, it always contains a phenol ring. With regard to a material for introducing a phenolic hydroxyl group into polyester, there is exemplified a compound which has a hydroxyl group and/or a carboxylic acid group for forming an ester bond and has an aromatic ring having a phenolic hydroxyl group and hydrogen atom at least at one of ortho- and para-positions to the said phenolic hydroxyl group. Examples of the specific compound thereof are diphenolic acid, p-hydroxybenzoic acid, p-hydroxyphenylacetic acid, p-hydroxyphenylpropionic acid, p-hydroxyphenethyl alcohol and 5-hydroxyisophthalic acid. Among them, diphenolic acid and p-hydroxyphenylacetic acid are preferred in view of the reactivity.

The polyester of the present invention contains 50 equivalents/ton or more of an aromatic ring which has a phenolic hydroxyl group and where at least one of ortho-position and para-position to the phenolic hydroxyl group is hydrogen atom in the resin. When it is less than 50 equivalents/ton, concentration of the reactive point may be too low whereby the cross-linking density may not be able to be increased.

Content of the aromatic ring is preferably 70 equivalents/ton or more and, more preferably, 80 equivalents/ton or more. Although its upper limit is selected depending upon the required characteristic and is not particularly limited, it is preferably 5,000 equivalents/ton or less, more preferably 3,000 equivalents/ton or less and, particularly preferably, 2,000 equivalents/ton or less.

With regard to the dibasic acid component of the polyester resin, there are exemplified aromatic dibasic acid such as terephthalic acid, isophthalic acid, o-phthalic acid and naphthalenedicarboxylic acid; aliphatic dicarboxylic acid such as succinic acid, glutaric acid, adipic acid, azelaic acid, sebacic acid, dodecanedicarboxylic acid and dimeric acid; and alicyclic dicarboxylic acid such as 1,4-cyclohexanedicarboxylic acid and 1,3-cyclohexanedicarboxylic acid. With regard to the glycol component, there are exemplified ethylene glycol, 1,2-propylene glycol, 1,3-propylene glycol, 1,4-butanediol, 1,3-butanediol, 1,5-pentanediol, 1,6-hexanediol, 3-methyl-1,5-pentanediol, neopentyl glycol, 2-ethyl-2-butyl-1,3-propanediol, diethylene glycol, 1,4-cyclohexanedimethanol, an adduct of bisphenol A with ethylene oxide, an adduct of bisphenol A with propylene oxide and polyether glycol such as polyethylene glycol, polypropylene glycol and polytetramethylene glycol.

Further, a lactone such as ε-caprolactone and δ-valerolactne and an oxycarboxylic acid such as p-hydroxyethoxybenzoic acid may be used as a material for the polyester resin as well.

It is also possible to jointly use trifunctional and higher functional components such as trimethylolpropane, pentaerythritol and trimellitic acid anhydride. It is particularly preferred to jointly use a trifunctional or higher functional component so as to abundantly incorporate a compound having one carboxyl group or hydroxyl group in a molecule such as diphenolic acid, p-hydroxyphenylacetic acid, p-hydroxyphenylpropionic acid or p-hydroxyphenethyl alcohol into a polyester resin.

With regard to a number-average molecular weight of the polyester resin of the present invention, it is preferred to be 3,000–50,000 and, more preferably, 5,000–30,000. When the said molecular weight is less than 3,000, the toughness of the coat may be poor while, when it is more than 50,000, viscosity of the solution may be high and inconveniences in the operation may be significant.

In the present invention, at least one member of thermosetting resin selected from melamine resin, urea resin, benzoguanamine resin and phenol resin is jointly used. A specific example is a compound containing a methylol group prepared by the reaction of a melamine, urea, benzoguanamine or phenol compound with formaldehyde or paraformaldehyde etc.

The methylol group may be etherified with an alcohol having 1–6 carbon atom(s). It is preferred that the ratio of polyester resin to thermosetting resin used is within a range of 5–100 parts by weight of the thermosetting resin to 100 parts by weight of the polyester resin.

In the present invention, it is preferred to add a catalyst for setting during the setting treatment so as to improve the setting property. With regard to the catalyst for setting, there are exemplified sulfuric acid, p-tolenesulfonic acid, dodecylbenzenesulfonic acid, naphthalenesulfonic acid and an amine block substance where all or a part of the above is neutralized with an amine compound. Although amount of the catalyst for setting to be added varies depending upon the conditions for setting treatment, etc., it is preferred to be within a range of 0.01–0.5 part by weight for 100 parts by weight of the polyester resin.

In the polyester and a composition thereof according to the present invention, there takes place a setting with a good efficiency due to an electrophilic substitution reaction by a methylol compound at ortho-position or para-position of a phenol ring introduced into the polyester resin.

of tetrabutyl titanate as a catalyst for the reaction were charged into an autoclave and the temperature was raised up to 220° C. After distillation of methanol by a transesterification reaction was finished, there were added 28.6 g of diphenolic acid and 9.6 parts of trimellitic acid anhydride. Esterification reaction was finished during the temperature was raised up to 240° C. After that, the inner system was gradually made vacuum and, finally, it was made 0.1 mmHg. During that period, the temperature was kept at 260° C.

Composition of the resulting polyester resin (A) was determined by measuring the NMR using deuterium chloroform as a solvent. Characteristics of the polyester resin are given in Table 1.

Synthetic Examples 2–4 for Polyester Resin

Polyester resins (B)–(D) having the compositions of Table 1 were prepared by the same manner as in the Synthetic Example 1 for Polyester Resin.

Comparative Synthetic Examples 1–3 for Polyester Resin

Polyester resins (E)–(G) having the compositions of Table 1 were prepared by the same manner as in the Synthetic Example 1 for Polyester Resin.

TABLE 1

| Materials/ | Synthetic Examples | | | | Comparative Synthetic Examples: | | |
|---|---|---|---|---|---|---|---|
| Characteristics | 1 | 2 | 3 | 4 | 5 | 6 | 7 |
| Resin | (A) | (B) | (C) | (D) | (E) | (F) | (G) |
| Materials Used | | | | | | | |
| Acid Components | | | | | | | |
| TPA | 85 | 92 | 75 | 100 | 100 | 97 | 100 |
| TMA | 5 | 3 | | | | 3 | |
| DPA | 10 | | | | | | |
| PAA | | | 5 | | | | |
| 5-OHIPA | | | | 25 | | | |
| Glycolic Components | | | | | | | |
| EG | 25 | 25 | 25 | 22 | 25 | 25 | 24.2 |
| PG | 75 | 75 | 75 | 75 | 75 | 75 | 75 |
| HPEA | | | | 3 | | | 0.8 |
| Concn. of Phenol Ring (eq/ton) | 950 | 230 | 1190 | 140 | 0 | 0 | 40 |
| Number-Average Molecular Weight | 8300 | 16000 | 7200 | 11000 | 14000 | 10200 | 16000 |
| Glass Transition Temp. (° C.) | 78 | 81 | 76 | 79 | 82 | 79 | 82 |

EXAMPLES

The present invention will now be specifically illustrated by way of the following Examples. The term which is just referred to as "part(s)" in the Examples means that/those by weight.

Number-average molecular weight was measured by means of a GPC (gel permeation chromatography) using tetrahydrofuran as a solvent.

Glass transition temperature was determined by using a differential scanning calorimeter at a temperature rising rate of 20° C./minute.

Synthetic Example 1 for Polyester Resin

Dimethyl terephthalate (165 parts), 114 parts of 1,2-propylene glycol, 31 parts of ethylene glycol and 0.068 part Abbreviations used in Table 1 are as follows.
TPA: terephthalic acid
TMA: trimellitic acid anhydride
DPA: diphenolic acid
PAA: p-hydroxyphenylacetic acid
5-OHIPA: 5-hydroxyisophthalic acid
EG: ethylene glycol
PG: 1,2-propylene glycol
HPEA: p-hydroxyphenethyl alcohol Example 1

The polyester resin (A) obtained in Synthetic Example 1 for polyester resin was dissolved in toluene/cyclohexanone (1/1 by weight) to give a concentration of 60% on a solid basis. To this solution were added 25 parts of phenol resin (CKM 1634 manufactured by Showa Kobunshi) and 0.1 part of p-toluenesulfonic acid to 100 parts of the polyester resin (A). The solution was coated on a Teflon film having a thickness of 50 $\mu$m to make the thickness of the coat after drying about 20 $\mu$m and dried and heated at 200° C. for 5 minutes.

The film which was set and released from the Teflon film was dipped for 1 hour in 2-butanone/toluene/cyclohexanone (1/1/1 by weight) and the rate of insoluble matters of the set layer in the solvent was measured. Further, mechanical strength of the set film was measured under a tensile velocity of 200 mm/minute at the temperature of 20° C. The result is shown in Table 2.

Examples 2–6

Polyester resin, thermosetting resin and catalyst as shown in Table 2 were compounded by the same manner as in Example 1 and subjected to a thermal treatment as shown in Table 2. Insoluble matters of the set coat in the solvent and mechanical strength were also measured as same as in Example 1. The result is shown in Table 2.

TABLE 2

| Composition (Solid Ratio by Weight) and Characteristics | Examples | | | | | |
|---|---|---|---|---|---|---|
| | 1 | 2 | 3 | 4 | 5 | 6 |
| Compounding | | | | | | |
| Polyester Resin Number | (A) | (A) | (A) | (B) | (C) | (D) |
| Compounding Amount | 100 | 100 | 100 | 100 | 100 | 100 |
| Thermosetting Resins | | | | | | |
| CKM 1634 | 25 | 25 | | | | |
| CKM 983 | | | | 30 | | 30 |
| Sumimal M40S | | | 25 | | 20 | |
| Catalyst (p-Toluenesulfonic Acid) | 0.1 | 0.3 | 0.1 | 0.3 | 0.1 | 0.3 |
| Thermal Treatment | | | | | | |
| Temperature (° C.) | 200 | 120 | 200 | 200 | 120 | 200 |
| Time (minutes) | 5 | 30 | 5 | 5 | 30 | 5 |
| Insoluble Matters in Solvent (%) | 98 | 88 | 100 | 95 | 95 | 92 |
| Mechanical Characteristics | | | | | | |
| Breakage Strength (kg/mm$^2$) | 6.8 | 4.8 | 7.6 | 5.5 | 6.4 | 5.0 |
| Breakage Ductility (%) | 8.2 | 4.8 | 9.3 | 5.3 | 7.1 | 5.2 |

Comparative Examples 1–6

Polyester resin, thermosetting resin and catalyst described in Table 3 were compounded by the same manner as in Example 1 and subjected to the thermal treatment as shown in Table 3. Insoluble matters of the resulting coat in the solvent and mechanical strength were measured as same as in Example 1. The result is shown in Table 3.

Comparative Examples 1–5 are the cases where a polyester resin containing no phenol ring is contained while Comparative Example 6 is the case where the polyester resin in which the phenol ring concentration is out of the range of the present invention.

TABLE 3

| Composition (Solid Ratio by Weight) and Characteristics | Comparative Examples | | | | | |
|---|---|---|---|---|---|---|
| | 1 | 2 | 3 | 4 | 5 | 6 |
| Compounding | | | | | | |
| Polyester Resin Number | (E) | (E) | (E) | (F) | (F) | (G) |
| Compounding Amount | 100 | 100 | 100 | 100 | 100 | 100 |
| Thermosetting Resins | | | | | | |
| CKM 1634 | 25 | | | 25 | | 25 |
| CKM 983 | | 30 | | | | |
| Sumimal M40S | | | 25 | | 25 | |
| Catalyst (p-Toluenesulfonic Acid) | 0.1 | 0.3 | 0.1 | 0.1 | 0.1 | 0.1 |
| Thermal Treatment | | | | | | |
| Temperature (° C.) | 200 | 200 | 200 | 200 | 120 | 200 |
| Time (minutes) | 5 | 5 | 5 | 5 | 30 | 5 |
| Insoluble Matters in Solvent (%) | 0 | 5 | 95 | 0 | 10 | 18 |
| Mechanical Characteristics | | | | | | |
| Breakage Strength (kg/mm$^2$) | 3.8 | 4.1 | 6.8 | 4.0 | 4.4 | 4.2 |
| Breakage Ductility (%) | 2.8 | 3.0 | 7.1 | 3.1 | 3.2 | 3.4 |

Abbreviations in Tables 2 and 3 are as follows.
CKM 1634: phenol resin of a resol type manufactured by Showa Kobunshi
CKM 983: phenol resin of a resol type manufactured by Showa Kobunshi
Sumimal M40S: hexamethoxymelamine manufactured by Sumitomo Chemical

Example 7

A solution of polyester (H)/phenol resin (CKM 1634 manufactured by Showa Kobunshi)/p-toluenesulfonic acid (100/25/0.2 by weight) in 2-butanone/toluene (1/1 by weight) was coated on a polyimide film having a thickness of 25 μm so as to form a coat having a thickness of 10 μm after drying followed by drying with hot air at 100° C. for 5 minutes. It retained a thermoplastic property upon heating at 100° C. for 5 minutes. Aluminum foil of a thickness of 50 μm was layered on the coated layer and subjected to a heat press at 150 ° C. for 1 hour with a pressure of 5 kg/cm$^2$.

Release strength of the resulting layered product at 20° C. and 100° C. was measured under a tensile velocity of 200 mm/minute. The result is shown in Table 4. The adhesive used was subjected to a thermal treatment at 150° C. for 1 hour as same as in Example 1 and the amount of the insoluble matters in the solvent was measured. Amount of the insoluble matters in the solvent was 98%.

Composition, concentration of phenol ring and number-average molecular weight of the polyester resin (H) are as follows.

Polyester resin (H):
Terephthalic acid/diphenolic acid/trimellitic acid//3-methyl-1,5-pentanediol=92/5/3//100 in terms of a molar ratio
Concentration of phenol ring: 390 equivalents/ton
Number-average molecular weight: 14,000

Comparative Example 7

A layered product of polyimide and aluminum foil was prepared by the same manner as in Example 7 except that a polyester resin (I) was used in place of the polyester resin (H).

Release strength of the resulting layered product at 20° C. and 100° C. was measured under a tensile velocity of 200 mm/minute. The result is shown in Table 4. Amount of the insoluble matters in the solvent after a thermal treatment at 150° C. for 1 hour was 0%; thus, they were dissolved in the solvent.

Composition, concentration of phenol ring and number-average molecular weight of the polyester resin (I) are as follows.

Polyester resin (I):

Terephthalic acid/ trimellitic acid//3-methyl-1,5-pentanediol=97/3//100 in terms of a molar ratio Concentration of phenol ring: 0 equivalent/ton Number-average molecular weight: 16,000

TABLE 4

| Measured Temperature | Example 7 | Comparative Example 7 |
|---|---|---|
| 20° C. | 2.3 kg/cm | 1.4 kg/cm |
| 100° C. | 1.3 kg/cm | 0.1 kg/cm |

As will be clear from Examples and Comparative Examples, the composition of the present invention has an excellent thermosetting property where the composition is set upon heating. As a result, the composition of the present invention has excellent toughness at ambient temperature and heat resistance.

What is claimed is:

1. A polyester resin composition comprising 50 equivalents/ton or more of an aromatic ring in the polyester resin and a phenol resin, wherein the aromatic ring in the polyester resin has a phenolic hydroxyl group and wherein at least one of ortho-position and para-position of the aromatic ring to the phenolic hydroxyl group is a hydrogen atom.

* * * * *